(12) United States Patent
Chen et al.

(10) Patent No.: US 7,471,448 B2
(45) Date of Patent: Dec. 30, 2008

(54) SURFACE PHONON-POLARITON RAMAN LASER

(75) Inventors: Gang Chen, Carlisle, MA (US); Xiaoyuan Chen, Acton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 258 days.

(21) Appl. No.: 11/371,809

(22) Filed: Mar. 9, 2006

(65) Prior Publication Data

US 2007/0211771 A1    Sep. 13, 2007

(51) Int. Cl.
*H04S 5/00*    (2006.01)
*H01S 5/30*    (2006.01)

(52) U.S. Cl. .................. 359/334; 372/3; 372/43.01; 977/951

(58) Field of Classification Search ................. 359/334; 372/3, 43.01; 977/951
See application file for complete search history.

(56) References Cited

U.S. PATENT DOCUMENTS

| 5,999,308 | A | 12/1999 | Nelson et al. | |
|---|---|---|---|---|
| 6,621,841 | B1 | 9/2003 | Soref et al. | |
| 2003/0234978 | A1* | 12/2003 | Garito et al. | 359/341.5 |

FOREIGN PATENT DOCUMENTS

WO    2005111584    11/2005

OTHER PUBLICATIONS

Hasman et al., "Space variant polarization manipulation of a thermal emmision by a SiO.sub.2 subwavelength grating supporting surface phonon-polariton", 2005 Conference on Lasers and Electro-Optics (CLEO), (IEEE cat. No. 05TH8796) vol. 2, pp. 843-845 (May 2005).*

Renger et al, "REsonant light scattering by near-field-induced phonon polaritons", Physical Review B, vol. 71, pp. 075410-1-7, (Feb. 18, 2005).*

Watanabe et al. , "Surface-phono polariton on grating of GaP thin slabs: Raman scattering", Physical Review B, vol. 40, No. 11, pp. 7860-7865, (Oct. 15, 1989).*

Troccoli et al., "Raman injection laser" Letters to nature, Feb. 24, 2005, vol. 433, pp. 845-848.

Rong et al., "A continuous-wave Raman silicon laser" Letters to Nature, Feb. 17, 2005, vol. 433, pp. 725-728.

Dice et al., "Plasmonically enhanced diffusive and subdiffusive metal nanoparticle-dye random laser" Applied Physics Letters, 83, 131105, pp. 11305-1-11305-3.

Greffet et al., "Coherent emission of light by thermal sources" Letters to Nature, Mar. 2002, vol. 416., pp. 61-64.

Sasaki et al., "Optical-phonon states of SiC small particles studied by Raman scattering and infrared absorption" Physical Review B, vol. 40, No. 3, 1989 The American Physical Society, Jul. 15, 1989, pp. 1762-1772.

(Continued)

*Primary Examiner*—Eric Bolda
(74) *Attorney, Agent, or Firm*—Gauthier & Connors LLP

(57) ABSTRACT

An optical device includes an input optical source that provides and optical signal to the optical device. A surface phonon polariton (SPP) nanostructure receives the optical signal that interacts with the SPP nanostructure to excite a Raman process and produce a Raman light signal. The Raman light signal comprises a broad spectral range from near infrared to far infrared.

18 Claims, 3 Drawing Sheets

OTHER PUBLICATIONS

Watanabe et al., "Observation of Increase in Raman Intensity of Surface Phonon Polaritons on Rough Surfaces" Solid State Communications, vol. 51, No. 5, 1984, pp. 289-291.

Torchynska et al., "Optical and structural investigation on porous SiC layers" First International Workshop on Semiconductor Nanocrystals Sep. 10-12, 2005, Budapest, Hungary, pp. 383-386.

* cited by examiner

SURFACE PHONON-POLARITON RAMAN LASER

BACKGROUND OF THE INVENTION

The invention relates to the field of emitting devices, and in particular to a new type of light emitting devices based on the concept of surface phonon polariton (SPP).

There has been a need for mid-infrared and far-infrared light emitting devices for use in many applications such as sensing and imaging. Given the various gains in research and development, the use of such devices is more frequently seen in semiconductor quantum cascade lasers and terahertz frequency generations by ultra-short pulses. In quantum cascade lasers, the long wavelength emission is obtained by injected electron transition between the quantum-confined energy levels within the conduction band by carefully bandgap engineering. Strong loses of generated long wavelength emission in a semiconductor has to be accommodated by a cooling device to operate below room temperature. In terahertz generations, a bulky and strong short pulse laser is required.

SUMMARY OF THE INVENTION

According to one aspect of the invention, there is provided an optical device including an input optical source that provides and optical signal to the optical device. A surface phonon polariton (SPP) nanostructure receives the optical signal that interacts with the SPP nanostructure to excite a Raman process and produce a Raman light signal. The Raman light signal comprises a broad spectral range from near infrared to far infrared.

According to another aspect of the invention, there is provided a method of producing surface phonon polariton (SPP) modes in an optical device. The method includes providing an optical signal to the optical device. Furthermore, the method includes allowing the optical signal to interact with a SPP nanostructure to excite a Raman process and produce a Raman light signal. The Raman light signal comprises a broad spectral range from near infrared to far infrared.

DETAILED DESCRIPTION OF THE INVENTION

Figure 1:
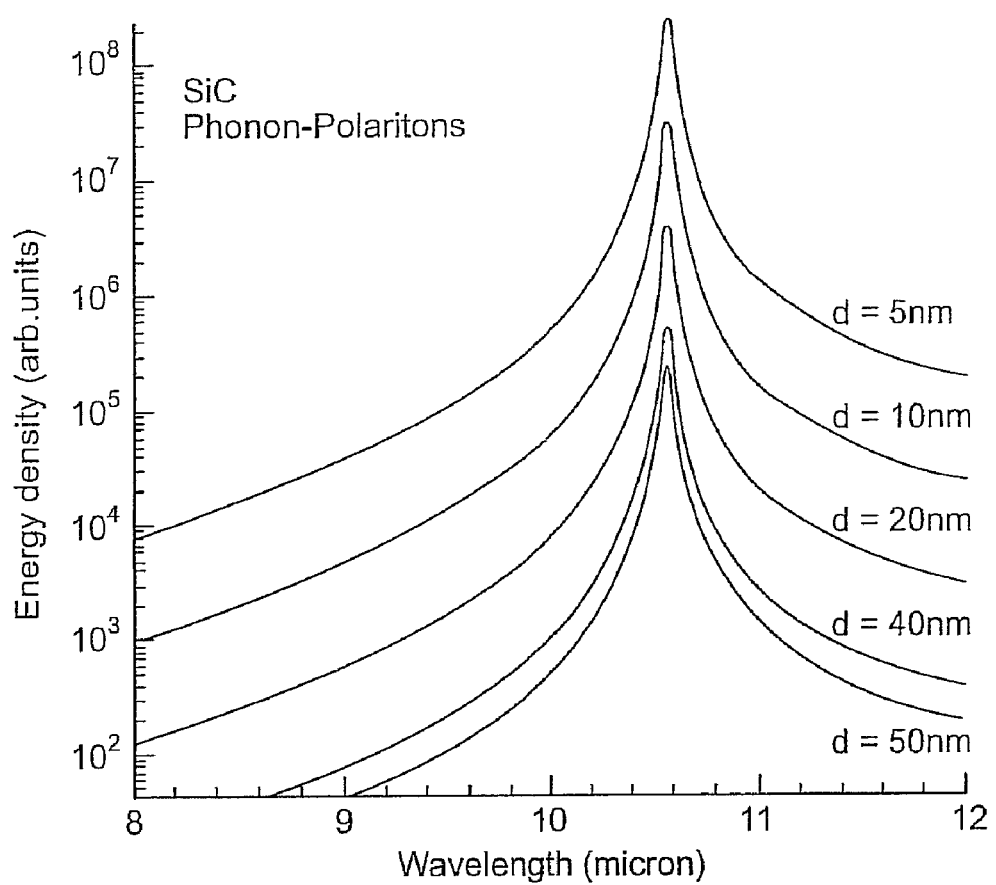
FIG. 1 are graphs demonstrating energy density of surface phone polariton wave of said inventive emitters.

The invention illustrates a new type of light emitting devices based on the concept of surface phonon polariton (SPP). The energy density of SPP modes could be more than $10^5$-$10^8$ times higher than bulk depending upon material and distance to the surface as shown example of SiC as in FIG. 1. When incoming light wave or photon interacts with the SPP, it can excite a Raman process in the media adjacent to an interface (Stokes and Anti-Stokes). In order for light to strongly couple with SPP, incoming light wave will be close to the SPP mode, which has wavelength range from 10 micron to 15 micron range for majority of ionic crystals. Therefore, the outgoing Raman light will cover a broad spectral range from near infrared to far infrared.

To realize the light amplification for lasing, the key factor here is field enhancement by high density SPP mode, which is analogous to the surface plasmon enhanced Raman scattering due to the high energy density of surface plasmon. Surface plasmon-based lasers have been developed. However, SPP-based lasers have not been developed. In a Raman amplifier or laser, the stimulated emission is mainly a third order nonlinear process, the field enhancement plays a key role. Furthermore, a narrower spectral mode width of SPP in comparison with surface plasmon will increase the gain factor and reduce the lasing threshold. Therefore, SPP based lasers are expected to have relative higher gain and cover a wide of wavelength range from mid-infrared to far infrared.

The new laser have many distinct advantages over existing ones. Unlike metallic surface plasmon enhancement systems, there is no electron exchange process in material interface, the potential metal absorption loss, dislocation or trap loss could be minimized. Secondly, typical long wavelength loss such as, Auger, free carrier and intra-valence band transition as in semiconductor quantum cascade lasers, could be greatly reduced in SPP laser where variety of surface media could be chosen, such as low loss and wide bandgap SiC. And third, in long wavelength region, a light wave can not be sensitive to structural imperfections shorter than the wavelength, therefore, it releases the restriction for SPP engineering. For example, in a surface plasmon field enhancement process, the enhancement factor depends strongly on the metallic material's size, shape and surrounding media. Moreover, a propagating wave can be amplified in 10ths of a micron within a one wavelength period; in other words, phase matching for propagating amplification is released. In the case of higher power or longer cavity lasers, the quazi-phase matching could be more easily realized.

Figure 2:
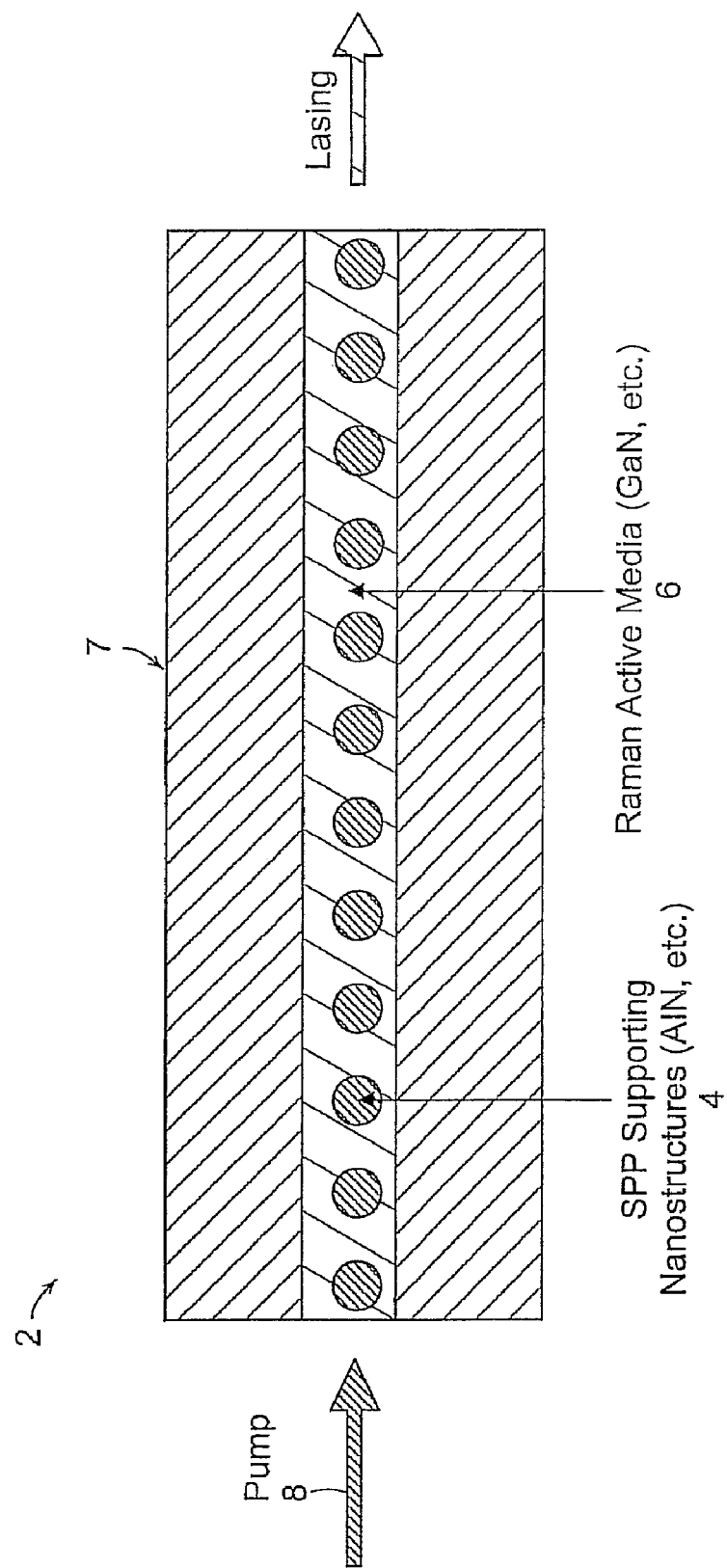
FIG. 2 is a schematic diagram demonstrating a surface phonon polariton (SPP) laser structure.

An exemplary laser structure 2 is shown in FIG. 2. The active media is composed of a SSP supporting nanostructures 4 and Raman active materials 6. The supporting nanostructures 4 are chosen depending on emitting wavelength, material engineering, device geometry and the materials which have high SPP density and wide energy bandgap with low optical loss, such as SiC, AlN, or the like. The Raman active materials 6 can be a broad range of materials. Any material with lower optical loss and higher nonlinear coefficient can be candidates, in this embodiment GaN is used. Output laser wavelength is chosen and determined by optical phone wavelength of the Raman media. Selection of a hosting material 7 depends on material engineering, waveguide requirements, and different applications and device geometries. For examples, metal gold can used as reflecting layer as excellent wave-guide for far infrared light wave.

Without top layer of hosting material 7 as shown in FIG. 2, other pump directions can be used depending on device geometry and its application. For example, in a random disk laser, a pump beam can be launched perpendicular to a disk plane when light emission could be along the plane. The Raman active materials 6 can be nano-sized structure as well. The smaller the size, the stronger field enhancement will be, and the smaller the size, the stronger nonlinear coefficient of Raman media itself is expected.

SPP structures can be engineered at the interface between two types of materials. There is a great advantage to engineer one material with air or vacuum. An air interface can minimize the loss of propagating waves, more importantly it is also conveniently used for material engineering and many practical applications. Therefore a 1D waveguide, such as a hollow fiber, or a 3D photonic crystal structure can be easily adapted for wave guiding and wavelength selection. SPP integrates with these wave guiding structures for the development of many other device applications. Since a SPP laser has many advantages as discussed above, their many practical application that can be realized.

Figure 3:
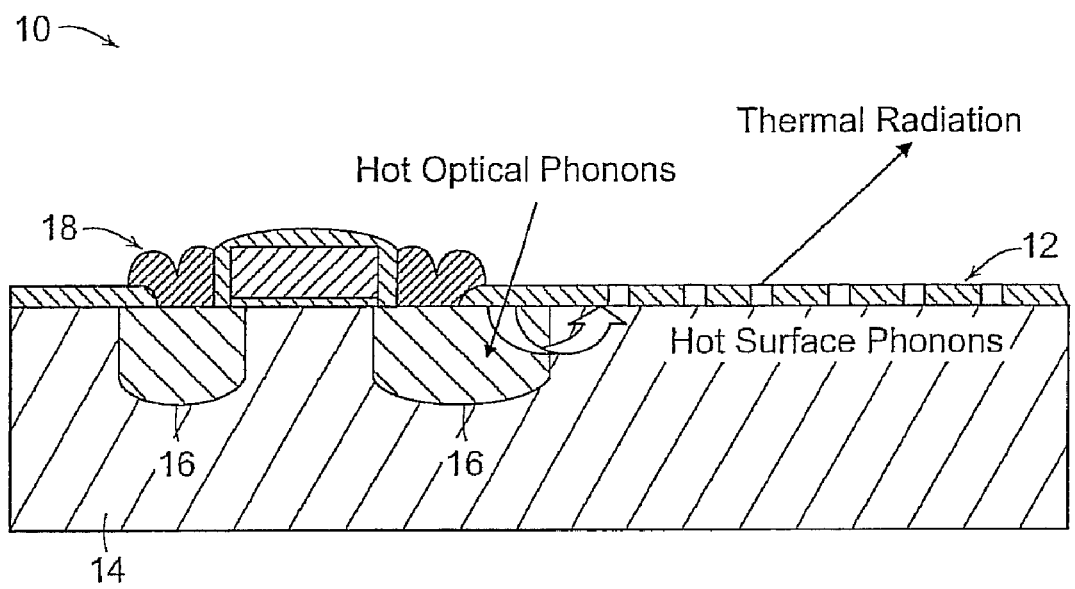
FIG. 3 is a schematic diagram demonstrating a SSP hot emitter.

An exemplary SSP hot emitter 10 is shown in FIG. 3. Without a pump source, the SPP structure 16 can be directly engineered with a hot source 18 which provides a propagated SPP wave. Emission is obtained by simple grating structures 12 to couple SPP modes and extract the light out. Grating structures 12 depends on wavelength, emission direction, and the emitter itself.

It is emphasized that the SPP light emitters and Raman lasers have many special characteristics and advantage. There is potential for the development of many devices used in various practical optical applications.

Although the present invention has been shown and described with respect to several preferred embodiments thereof, various changes, omissions and additions to the form and detail thereof, may be made therein, without departing from the spirit and scope of the invention.

What is claimed is:

1. An optical device comprising:
    an input optical source that provides an optical signal to said optical device;
    a plurality of Raman active materials comprising materials having low optical loss and high nonlinear coefficient; and
    a plurality of surface phonon polariton (SPP) nanostructures that receive said optical signal that interacts with said SPP nanostructures and said Raman active materials to excite a Raman process and produce a Raman light signal, said Raman light signal comprising a broad spectral range from near infrared to far infrared.

2. The optical device of claim 1, wherein said input optical source comprises an optical pump.

3. The optical device of claim 1, wherein said input optical source comprises a hot source.

4. The optical device of claim 2, wherein said SPP nanostructure comprises a 3D dot structures.

5. The optical device of claim 3, wherein said SPP nanostructure receives directly a propagated wave from said hot source.

6. The optical device of claim 4 further comprising a waveguide structure for guiding said Raman light.

7. The optical device of claim 5 further comprising grating structures for emitting said Raman light.

8. The optical device of claim 6, wherein said optical devices defines a laser.

9. The optical device of claim 7, wherein said optical device defines an emitter.

10. A method of producing surface phonon polariton (SPP) modes in an optical device comprising:
    providing an optical signal to said optical device; and
    allowing said optical signal to interact with a plurality of SPP nanostructures and Raman active materials to excite a Raman process and produce a Raman light signal, said Raman light signal comprising a broad spectral range from near infrared to far infrared.

11. The method of claim 10, wherein said providing an optical signal comprises using an optical pump.

12. The optical device of claim 10, wherein said providing an optical signal comprises using a hot source.

13. The optical device of claim 11, wherein said allowing said optical signal to interact with a SPP nanostructure comprises using a 3D dot structure.

14. The optical device of claim 12, wherein said allowing said optical signal to interact with a SPP nanostructure comprises receiving directly a propagated wave from said hot source.

15. The optical device of claim 13 further comprising providing a waveguide structure for guiding said Raman light.

16. The optical device of claim 14 further comprising providing grating structures for emitting said Raman light.

17. The optical device of claim 15, wherein said optical devices defines a laser.

18. The optical device of claim 16, wherein said optical device defines an emitter.

* * * * *